3,060,226
PREPARATION OF ETHYLENE
DIMETHACRYLATE
George Edward Munn, Wilmington, Del., assignor to E. I.
du Pont de Nemours and Company, Wilmington, Del.,
a corporation of Delaware
No Drawing. Filed Apr. 7, 1960, Ser. No. 20,551
3 Claims. (Cl. 260—486)

This invention relates to a process for the production of ethylene dimethacrylate and more particularly to a process for the production of a directly polymerizable mixture of ethylene glycol and methyl methacrylate.

Ethylene dimethacrylate which has the structure:

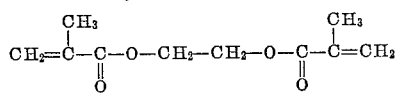

is an excellent crosslinking agent for acrylic resins, particularly polymers of methyl methacrylate. As can be seen from the structure, ethylene dimethacrylate could theoretically be prepared by the direct esterification of methacrylic acid with ethylene glycol or from the transesterification of alkyl methacrylate with ethylene glycol. Practically, however, these reactions are difficult to carry out because of the tendency of methacrylic compounds to polymerize under reaction conditions. In these reactions, polymerization can be deterred by the addition of large amounts of a polymerization inhibitor to the reaction mixture. Practically, however, this causes many problems since most of the inhibitor must be removed before the product is useful as a polymer precursor and thus making these processes economically unattractive. Before the present discovery, no entirely satisfactory process was known for the preparation of ethylene dimethacrylate by transesterification of methyl methacrylate with ethylene glycol.

It is an object of this invention to provide a process for the preparation of ethylene dimethacrylate. It is another object of this invention to provide improvements in mixtures comprising ethylene dimethacrylate and methyl methacrylate. It is a further object of this invention to provide an economical process for the preparation of a directly polymerizable mixture of ethylene dimethacrylate and methyl methacrylate. Other objects will appear hereinafter.

The objects of this invention are accomplished by the process which comprises contacting a mixture of ethylene glycol and an excess of methyl methacrylate with 0.01 to 1.0% by weight, based on said mixture, of an alkali metal alkoxide in the presence of 0.001% to 0.10% by weight, based on said mixture, of a polymerization inhibitor at a temperature in the range of 35° C. to 130° C. while removing a portion of the methanol by-product by distillation forming ethylene dimethacrylate thereby, boiling the reaction mixture at a boil-up rate greater than 0.4%/min. under a pressure in the range of 100 to 760 mm. Hg while continuously removing the methanol by-product by condensing and recovering a portion of the vapors, and recovering a directly polymerizable mixture of ethylene dimethacrylate and methyl methacrylate formed thereby. In accordance with the present invention it was discovered that ethylene dimethacrylate could be prepared in good yield and purity by the aforesaid process.

In a preferred method of carrying out the present invention, a mixture of ethylene glycol and methyl methacrylate are placed in a stirred reactor. There is added sufficient polymerization inhibitor to prevent substantially all polymerization under the reaction conditions employed. Since the product will most likely be used as a polymer precursor, as small amount of inhibitor as possible should be employed. Generally .005% to .015% by weight, based on the weight of reactants, is preferred. Any of the free radical polymerization inhibitors well known in the art may be employed. Specific examples of suitable inhibitors include N,N′di-β-naphthyl-p-phenylene diamine, p-methoxyphenol, hydroquinone, 4-t-butyl catechol, quinone, 9,10-phenanthraquinone and cloranil. The molar proportion of the glycol to the methacrylate must be greater than 1:2 and preferably between 1:3 and 1:20. Most preferably the ratio is between 1:3 and 1:8.

Approximately .01% to 1.0% by weight, based on the reactants, of any alkali metal alkoxide is added to the reaction mixture as the transesterification catalyst. The preferred catalyst is sodium methoxide. Conveniently, the catalyst is added as an alcohol solution. Preferably, the glycol-methacrylate mixture is stripped of any water which may be present, prior to the addition of the catalyst since considerably less catalyst is required when the reactants are water free.

The mixture is then maintained at reflux temperature. The methanol by-product is continuously removed from the reaction mixture by distillation. The degree of completion of the reaction can be made by measuring the methanol by-product distilled from the reaction mixture, by gas chromatography of the reaction mixture and by other methods known to those skilled in the art.

When the reaction has reached approximately 50% completion, the rate of methanol removal becomes critical. Prior to this time, fast removal of the methanol insures a short reaction time but is not otherwise necessary. The methanol by-product is continuously removed from the reaction by distillation at a boil-up rate greater than 0.4%/minute. The boil-up rate is defined as the weight percent of the material in the distillation pot which is vaporized per unit time. When boil-up rates less than 0.4%/min. and particularly below 0.3%/min. are used, the yield of ethylene dimethacrylate is markedly decreased. While it is not entirely understood, it appears that during this stage of the reaction the presence of larger amounts of methanol in the reaction mixture increases the tendency for side reactions to occur. It is highly desirable that the methanol by-product be removed as rapidly as possible. To this end it is advantageous to employ vacuum distillation, which also permits methanol removal at a lower pot temperature which, in turn, minimizes polymerization and other side reactions. Pressures in the range of 100 mm. Hg to 760 mm. Hg may be employed and preferably pressures of 200 to 400 mm. Hg are used. The distillate contains primarily methanol and methyl methacrylate which may be recovered if desired. If a distillation column is used the methanol will be more concentrated and less methyl methacrylate will be removed from the reaction pot.

During the course of the reaction the catalyst often tends to lose its activity as the reaction proceeds. Additional amounts of the catalyst added periodically during the reaction tend to cause the reaction to occur at a desirable rate. Generally 1 to 5 additions of 2% to 20% of the original catalyst charge is sufficient. These catalyst additions are most advantageously employed during the latter stages of the reaction.

As the reaction mixture nears completion, the tendency for the reaction mixture to polymerize is greatly increased. Therefore, in almost all instances, it is advantageous to stop the reaction just short of completion by lowering the pot temperature, by destroying the catalyst, or by adding methanol. Acids are effective in destroying the catalyst. Generally the degree of completion of the reaction may be determined by the foregoing methods, or by monitoring the temperature of the distillate. For a given reactor and reaction conditions, the degree of completion can be determined very accurately by this latter method. If the reaction mixture should begin to polymerize, the addition of a small amount of methanol or an acid will terminate the polymerization.

Air should be excluded from the reactor until the reaction mixture has cooled to 50° C. to 55° C. Air tends to initiate polymerization and discolors the product at temperature above 60° C. If the catalyst is destroyed as explained above, the tendency for the mixture to discolor is also decreased.

The product is a clear, colorless solution having approximately 20% to 80% by weight, based on the total composition, of ethylene dimethacrylate. This solution may be used as a polymer precursor either alone or as an ingredient in polymer precursor mixtures. If desired, the ethylene dimethacrylate may be separated from the reaction mixture by methods known to those skilled in the art.

In order to further illustrate various aspects of the present invention and preferred embodiments thereof, the following examples are included.

*Example I*

Into a two liter stirred resin kettle equipped with a thermometer, dropping funnel and an 18 inch by 1 inch I.D. column packed with 6 mm. x 6 mm. glass rings was charged 1300 grams of methyl methacrylate containing 50 p.p.m. of hydroquinone, 248 grams of ethylene glycol and 0.17 gram of hydroquinone. The system was evacuated to 200 mm. Hg. The reactor was heated and 25 ml. of material stripped from the reactor to remove any water which might have been present. Five grams of 25% sodium methoxide in methanol was added and the reaction mixture was heated to boiling under a pressure of 300 mm. Hg. After boiling for several minutes at total reflux, the column head temperature dropped to 42.5° C. and held steady for several minutes. Sufficient heat was applied to the pot to maintain a boil-up ratio of at least .46%/min. Distillate was then collected at constant boil-up ratio maintaining the reflux ratio such that the head temperature remained below 45° C. After the distillate had been collected for approximately 32 minutes, an additional 1 gram of catalyst solution was added to the reaction mixture. Another 1 gram of catalyst solution was likewise added after the distillate had been collected for 113 minutes. At this point 290 grams of distillate had been collected containing approximately 67% methanol. When it became impossible to maintain the head temperature below 45° C. with a reflux ratio less than 20/1, the reflux ratio of 20/1 was maintained and the head temperature was allowed to increase to 60° C. whereupon the reaction mixture was cooled and 2 grams of acetic acid were added. At this point the pot temperature was 99.5° C. and approximately 427 grams of distillate had been recovered containing 63% methanol. The boil-up ratio was slowly increased throughout the reaction until at the termination the boil-up ratio had reached a maximum of 7.4%/min. After filtering, there was recovered 1110 grams of a product containing 66.3% by weight of ethylene dimethacrylate representing 93% conversion of the ethylene glycol starting material. The product is clear and colorless.

*Example II*

Example I was repeated except that a boil-up ratio of 0.2 to 0.32%/min. was maintained throughout the reaction. The conversion to ethylene dimethacrylate was only 72% as compared to 93% conversion for Example I. In addition, the product of this example was noticeably yellow.

The foregoing examples are included as illustration of preferred embodiments of the present invention and are not to be construed as limitations thereof.

A process of the present invention is useful in preparing ethylene dimethylate and mixtures of ethylene dimethacrylate and methyl methacrylate in commercial quantities.

I claim:

1. A process for the production of a directly polymerizable mixture of ethylene dimethacrylate and methyl methacrylate which comprises contacting a mixture of ethylene glycol and an excess of methyl methacrylate with 0.01 to 1.0% by weight, based on said mixture, of an alkali metal alkoxide in the presence of 0.001% to 0.10% by weight, based on said mixture, of a polymerization inhibitor, at a temperature in the range of 35° C. to 120° C. while removing a portion of the methanol by-product by distillation forming ethylene dimethacrylate thereby, boiling the reaction mixture at a boil-up rate greater than 0.4%/min. under a pressure in the range of 100 to 760 mm. Hg while continuously removing the methanol by-product by condensing and recovering a directly polymerizable mixture of ethylene dimethacrylate and methyl methacrylate formed thereby.

2. The process of claim 1 wherein the molar proportion of ethylene glycol and methyl methacrylate is between 1:3 and 1:8.

3. The process of claim 1 wherein the alkali metal alkoxide is sodium methoxide.

References Cited in the file of this patent

UNITED STATES PATENTS 2,129,722   Woodhouse _____ Sept. 13, 1938